United States Patent

Steele

[15] 3,645,560
[45] Feb. 29, 1972

[54] HITCH EXTENSION MEANS

[72] Inventor: Merrell D. Steele, 822 East Broadway, Des Moines, Iowa 50313

[22] Filed: May 6, 1970

[21] Appl. No.: 35,195

[52] U.S. Cl.............................280/482, 280/406 A, 280/491
[51] Int. Cl.............................................................B60d 1/00
[58] Field of Search.....................280/482, 406 A, 476, 491

[56] References Cited

UNITED STATES PATENTS

| | | | |
|---|---|---|---|
| 3,411,644 | 11/1968 | Cook | 280/482 UX |
| 3,155,399 | 11/1964 | Fetzko | 280/482 |
| 3,385,610 | 5/1968 | Vezina | 280/482 |
| 2,713,501 | 7/1955 | Peak | 280/482 UX |
| 2,515,705 | 7/1950 | Gardiner | 280/476 |
| 2,523,211 | 9/1950 | Hedgpeth | 280/476 X |
| 3,151,879 | 10/1964 | Bock | 280/406 A |

FOREIGN PATENTS OR APPLICATIONS 534,775   12/1956   Canada..............................280/406 A

*Primary Examiner*—Leo Friaglia
*Attorney*—Zarley, McKee & Thomte

[57] ABSTRACT

A hitch extension means for use with a trailer having a forwardly extending tongue means with a first coupling socket means on the forward end thereof. The extension means comprises a second coupling socket means at the forward end thereof which may be detachably secured to a coupling ball at the rearward end of the vehicle. The extension means includes first and second frame members which extend outwardly and rearwardly from the second coupling socket means. A third frame member extends between the rearward ends of the first and second frame members over the tongue means. A plate is secured to the first and second frame members rearwardly of the second coupling socket means and has a coupling ball mounted thereon adapted to detachably receive the first coupling socket thereon. Means is provided on the extension means to limit the movement of the extension means with respect to the trailer tongue.

4 Claims, 5 Drawing Figures

Patented Feb. 29, 1972

3,645,560

INVENTOR
MERRELL D. STEELE
BY
Zarley, McKee & Thomte
ATTORNEYS

HITCH EXTENSION MEANS

Travel trailers or the like generally have a V-shaped tongue means at the forward end thereof which has a coupling socket means mounted thereon for attachment to the coupling ball at the rearward end of the pulling vehicle. When a vehicle such as a pickup truck or the like pulls the trailer, damage frequently occurs to the trailer and/or pickup during turning or backing operations due to the short trailer tongue means. Further, the position of the trailer tongue jack makes access to the rearward end of the pickup extremely inconvenient.

Therefore, it is the principal object of this invention to provide a hitch extension means.

A further object of this invention is to provide a hitch extension means for use with a trailer or the like.

A further object of this invention is to provide a hitch extension means which prevents damage to the trailer and/or pulling vehicle during turning and backing operations.

A further object of this invention is to provide a hitch extension means for use with a trailer which facilitates the backing operation of the same.

A further object of this invention is to provide a hitch extension means for use with a trailer which is adapted to have equalizer or stabilizer hitch attachments secured thereto.

A further object of this invention is to provide a hitch extension means for use with a trailer which tends to reduce the tow weight on the trailer hitch.

A further object of this invention is to provide a hitch extension means which is economical to manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

Figure 2:
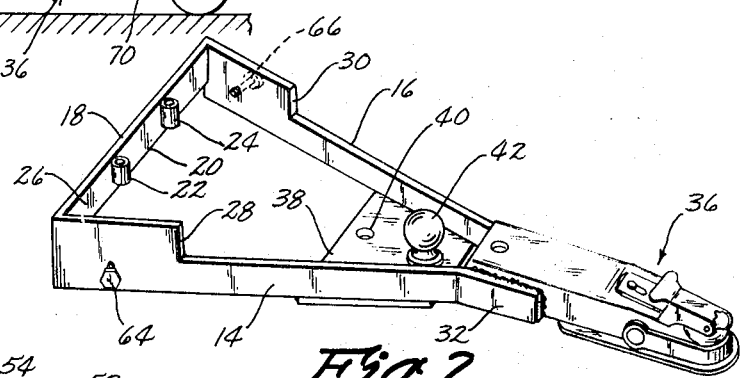
FIG. 2 is a front perspective view of the hitch extension of this invention.

The hitch extension of this invention is generally designated by the reference numeral 10 and is best illustrated in FIG. 2. Frame member 12 extends between the upper rearward ends of frame members 14 and 16 which extend inwardly and forwardly therefrom. Frame member 12 includes top 18, bottom 20 and has pipes 22 and 24 secured to its forward end 26 be welding or the like in spaced relationship. Frame members 14 and 16 have shoulders 28 and 30 formed thereon intermediate the ends thereof respectively. Frame members 14 and 16 include forward end portions 32 and 34 respectively which are parallel to each other and which are secured by welding or the like to a conventional hitch coupling socket means generally designated by the reference number 36.

Plate 38 is secured to the undersides of frame members 14 and 16 by welding rearwardly of forward end portions 32 and 34. Plate 38 has a pair of spaced-apart openings 40 provided therein, each of which are adapted to have a hitch coupling ball 42 mounted therein in conventional fashion.

Figure 1:
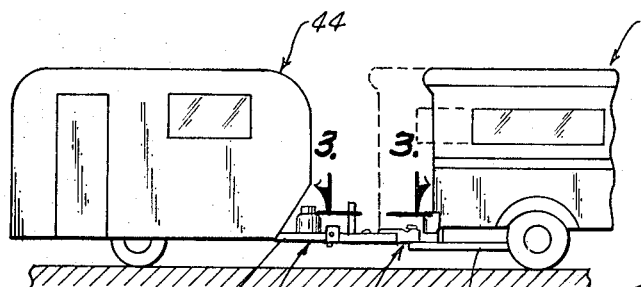
FIG. 1 is a side view of the hitch extension of this invention being employed on a trailer, the broken lines indicating the position of the truck if the hitch extension were not used.

A trailer 44 is illustrated in FIG. 1 and has a tongue means 46 extending forwardly from the forward end thereof. Tongue means 46 comprises generally a pair of tongue members 48 and 50 which extend inwardly and forwardly with respect to each other. A hitch coupling socket means 52 is secured to the forward ends of tongue members 46 and 48 and includes a plate means 54 upon which is mounted a conventional jack 56 for supporting the tongue means 46.

Figure 3:
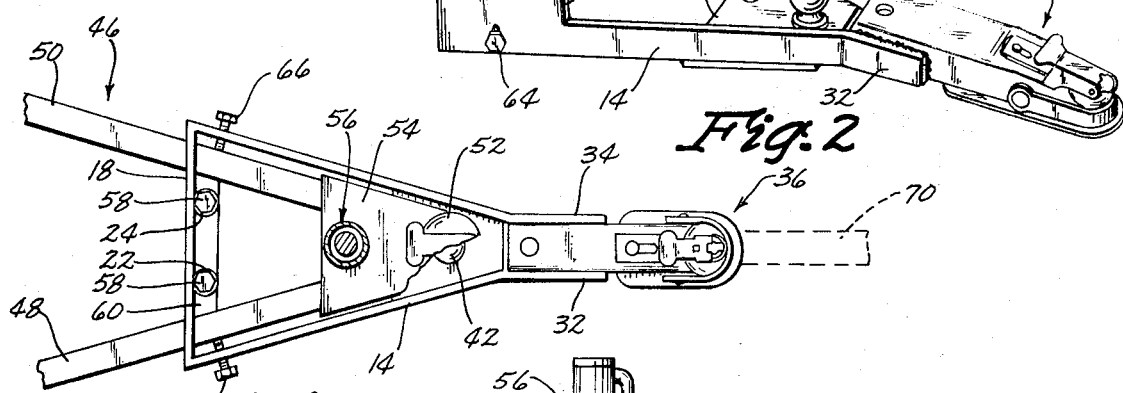
FIG. 3 is a top view of the hitch extension of this invention secured to a trailer tongue with portions thereof cut away to more fully illustrate the invention.
Figure 4:
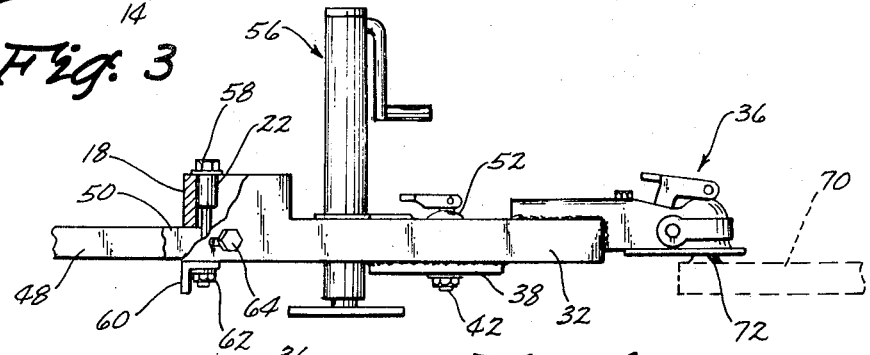
FIG. 4 is a fragmentary side view of the extension of this invention secured to a trailer tongue.
Figure 5:
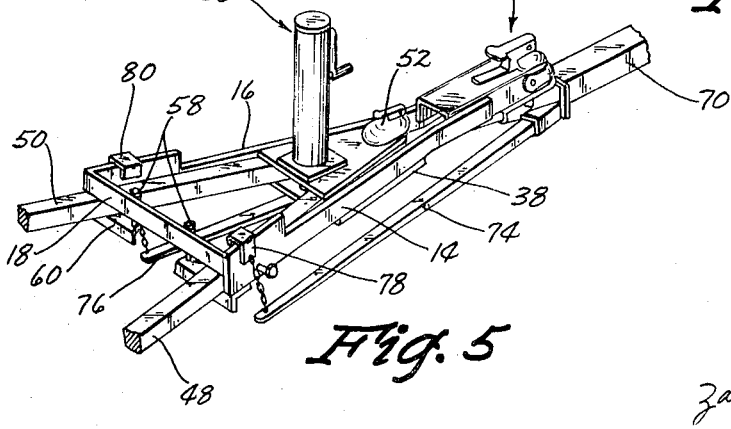
FIG. 5 is a rear perspective view of the extension of this invention mounted on a trailer tongue and being secured to the vehicle hitch.

The hitch extension 10 is mounted on the trailer tongue means 46 as illustrated in FIGS. 3, 4 and 5 so that bottom 20 of frame member 12 extends across the top of tongue members 48 and 50. Coupling socket means 52 is secured to coupling ball 42 in conventional fashion. The relationship of the hitch extension 10 can be changed by simply placing the ball 42 in either of the openings 40.

Bolts 58 are then extended downwardly through the pipes 22 and 24 so as to extend through an angle member 60 which extends beneath the tongue members 48 and 50. Nuts 62 are then mounted on the bolt 58 to limit the vertical movement of the extension 10 with respect to the tongue means 46. Extension 10 is provided with set screws 64 and 66 which threadably extend inwardly through frame members 14 and 16 respectively so as to engage the outer surface of tongue members 48 and 50 respectively to aid in further stabilizing the hitch extension with respect to the trailer tongue means.

The use of the hitch extension means effectively increases the length of the trailer tongue means so that the trailer is spaced farther from the rearward end of a truck generally designated by the reference numeral 68. Truck 68 includes a rearwardly extending hitch means 70 including coupling ball 72 adapted to receive the coupling socket means 36 thereon in conventional fashion. The hitch extension means 10 is especially well suited for use with those hitches 70 having stabilizing bars 74 and 76 extending rearwardly therefrom. The bars 74 and 76 generally are provided with clamps 78 and 80 at the rearward ends thereof. The hitch extension means 10 is adapted to receive the clamps 78 and 80 as illustrated in FIG. 5.

In operation, the increased trailer tongue length insures that the trailer and/or truck will not become damaged during backing or turning operations. Further, the increased tongue length makes the backing operation much easier. Additionally, the fact that the jack means 56 has been effectively moved rearwardly from the rearward end of the truck provides more convenient access to the rearward end of the truck. The hitch extension means of this invention also tends to reduce the tow weight on the trailer tongue. Thus it can be seen that an extremely stable and efficient hitch extension means has been provided for trailers or the like which accomplishes at least all of its stated objectives.

I claim:
1. In combination with a trailer hitch assembly having a coupling socket means at the forward ends of first and second tongue members which extend outwardly and rearwardly therefrom,
   a hitch extension having rearward and forward ends,
   first means operatively securing the rearward end of said extension means to the first and second tongue members,
   said extension means having means rearwardly of its forward end for detachably receiving the coupling socket means,
   said extension means having a coupling socket means at its forward end adapted to be secured to a coupling ball at the rearward end of a vehicle,
   said extension means comprising first and second frame members secured to said coupling socket means at the forward end of said extension means and extending outwardly and rearwardly therefrom,
   a third frame member secured to and extending between the rearward ends of said first and second frame members,
   said third frame member extending over said tongue members,
   first and second spaced apart pipe members secured to said third frame member,
   first and second bolt members extending downwardly through said first and second pipe members respectively,
   a fourth frame member beneath said tongue members operatively secured to said first and second bolt members to limit the vertical movement of the rearward end of said extension means with respect to said tongue members.

2. In combination with a trailer hitch assembly having a coupling socket means at the forward ends of first and second tongue members which extend outwardly and rearwardly therefrom,
a hitch extension means having rearward and forward ends,
first means operatively securing the rearward end of said extension means to the first and second tongue members,
said extension means having means rearwardly of its forward end for detachably receiving the coupling socket means,
said extension means having a coupling socket means at its forward end adapted to be secured to a coupling ball at the rearward end of a vehicle,
said extension means comprising first and second frame members secured to said coupling socket means at the forward end of said extension means and extending outwardly and rearwardly therefrom,
a third frame member secured to and extending between the rearward ends of said first and second frame members,
said first and second frame members being positioned outwardly of said first and second tongue members respectively,
first and second set screw means threadably extending through said first and second frame members adjacent the rearward ends thereof respectively adapted to engage said first and second tongue members respectively to limit horizontal movement of the rearward end of said extension means with respect to said tongue members.

3. In combination with a trailer hitch assembly having a coupling socket means at the forward ends of first and second tongue members which extend outwardly and rearwardly therefrom,
a hitch extension means having rearward and forward ends,
first means operatively securing the rearward end of said extension means to the first and second tongue members,
said extension means having means rearwardly of its forward end for detachably receiving the coupling socket means,
said extension means having a coupling socket means at its forward end adapted to be secured to a coupling ball at the rearward end of a vehicle,
said extension means comprising first and second frame members secured to said coupling socket means at the forward end of said extension means and extending outwardly and rearwardly therefrom,
a third frame member secured to and extending between the rearward ends of said first and second frame members,
said third frame member extending over said tongue members,
a fourth frame member beneath said tongue member and beneath said third frame member,
and means securing said third and fourth frame members to said tongue members to limit the vertical movement of the rearward end of said extension means with respect to said tongue members.

4. The combination of claim 3 wherein the forward ends of said first and second frame members dwell in substantially the same horizontal plane as said tongue members, said first and second frame members having rearward end portions extending upwardly above said tongue members for receiving one end of a spring bar means extending rearwardly from the vehicle.

* * * * *